(12) United States Patent
Voves

(10) Patent No.: US 6,354,647 B1
(45) Date of Patent: Mar. 12, 2002

(54) MOVEABLE SUPPORT SYSTEM FOR A CROSSOVER BOX

(76) Inventor: Mark A. Voves, 24662-110th St., Cresco, IA (US) 52136

( * ) Notice: Subject to any disclaimer, the term of this patent is extended or adjusted under 35 U.S.C. 154(b) by 0 days.

(21) Appl. No.: 09/900,207

(22) Filed: Jul. 6, 2001

(51) Int. Cl.⁷ .................................................. B60R 9/00
(52) U.S. Cl. ..................................... 296/37.6; 224/404
(58) Field of Search .......................... 296/37.6; 224/404, 224/548

(56) References Cited

U.S. PATENT DOCUMENTS

| | | | |
|---|---|---|---|
| 4,522,326 A | | 6/1985 | Tuohy, III |
| 5,037,153 A | * | 8/1991 | Stark ........................ 296/37.6 |
| 5,052,737 A | | 10/1991 | Farmer, Jr. |
| 5,052,739 A | * | 10/1991 | Irwin ........................ 296/37.6 |
| 5,088,636 A | | 2/1992 | Barajas |
| 5,121,959 A | | 6/1992 | King |
| 5,301,913 A | | 4/1994 | Wheatley |
| 5,584,521 A | | 12/1996 | Hathaway et al. |
| 5,598,961 A | | 2/1997 | Sills |
| 5,685,593 A | * | 11/1997 | 'Connor ..................... 224/404 |
| 5,924,616 A | * | 7/1999 | Shives .................... 296/37.6 X |
| 6,116,673 A | * | 9/2000 | Clonan ....................... 296/37.6 |
| 6,264,083 B1 | * | 7/2001 | Pavlick et al. ......... 296/37.6 X |

\* cited by examiner

*Primary Examiner*—Joseph D. Pape

(57) ABSTRACT

A moveable support system for mounting a crossover tool box having a pair of rails and a pair of blocks connected to the crossover tool box and slidably mounted to the rails. The blocks having a plurality of recesses within where wheels are rotatably mounted and extend through a lower opening in the recesses to engage the top surface of the rails. The blocks also having an inverted T-shape groove that receives a bolt for connecting the blocks to the crossover tool box. Also a locking device prevents movement of the block along the rail.

9 Claims, 4 Drawing Sheets

MOVEABLE SUPPORT SYSTEM FOR A CROSSOVER BOX

BACKGROUND OF THE INVENTION

This invention relates to a moveable support system for mounting a variety of accessories upon the bed of a pick-up truck, and more particularly to a moveable support system for mounting a crossover tool box.

There exist a variety of devices for mounting accessories to the bed of a pick-up truck. Some of these devices include rail systems for slidably mounting tool boxes between the side walls of the bed. Not only are these devices complicated in their structure and difficult to assemble and operate, but they are not easily adapted to fit truck beds of different shapes and sizes.

Therefore, a primary objective of this invention is to provide a moveable support system that is easily adapted to truck beds of different shapes and sizes.

A further objective of the present invention is to provide a moveable support system that is easy and economical to manufacture having a minimum of machined parts.

A still further objective of this invention is to provide a moveable support system that is easy to assemble and operate.

SUMMARY OF THE INVENTION

The moveable support system for a crossover box has a pair of elongated rails that are mounted to the sidewalls of a truck bed. The rails have an elongated plate that extends across the top surface of the truck sidewall and a vertical support element that extends downwardly from the plate engaging the inner edge of the truck sidewall.

A pair of blocks are attached to the bottom of the outer sides of the crossover box and are superimposed over the rails. The blocks have slide elements on the inner edges of the blocks that extend downwardly and thence outwardly to form recesses to receive the rails. On the outer edge of the blocks are vertical shoulders that extend downwardly and engage the outer edge of the rail. Within the blocks are a plurality of recesses with each having a lower opening in communication with the top surface of the rails. Mounted within these recesses are rotatable wheels that extend through the lower openings to engage the top surface of the rails.

Extending transversely through the block and having an open upper end is an inverted T-shaped groove with a horizontal portion and a vertical portion. An inverted mounting bolt having a head that is slidably mounted within the horizontal portion of the groove and a stem that is slidably mounted within the vertical portion and extends upwardly out of the upper end of the groove connects the block to the crossover box.

DETAILED DESCRIPTION OF THE INVENTION

Figure 1:
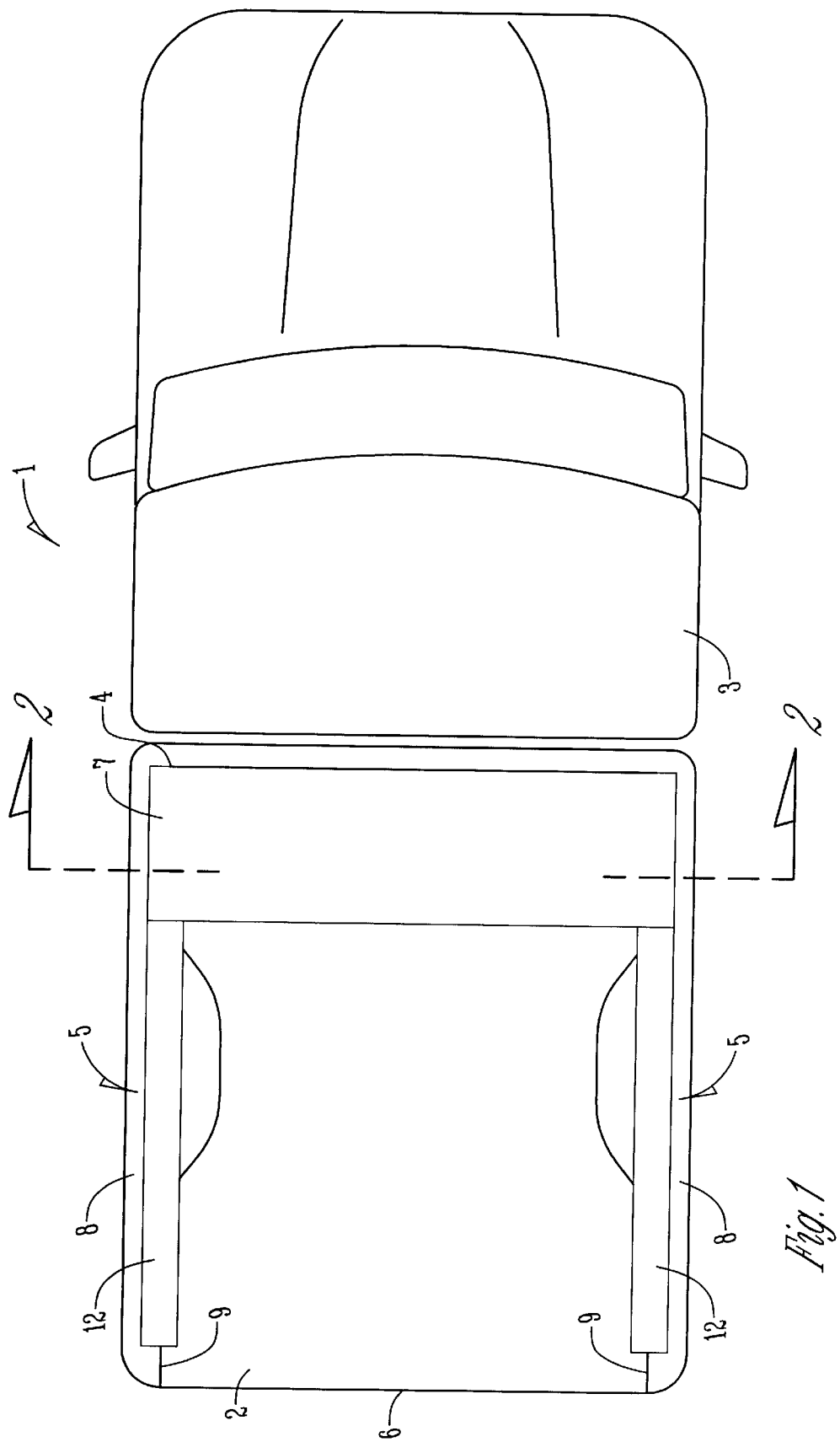
FIG. 1 is a top plan view of the crossover box of this invention mounted on a truck bed.
Figure 2:
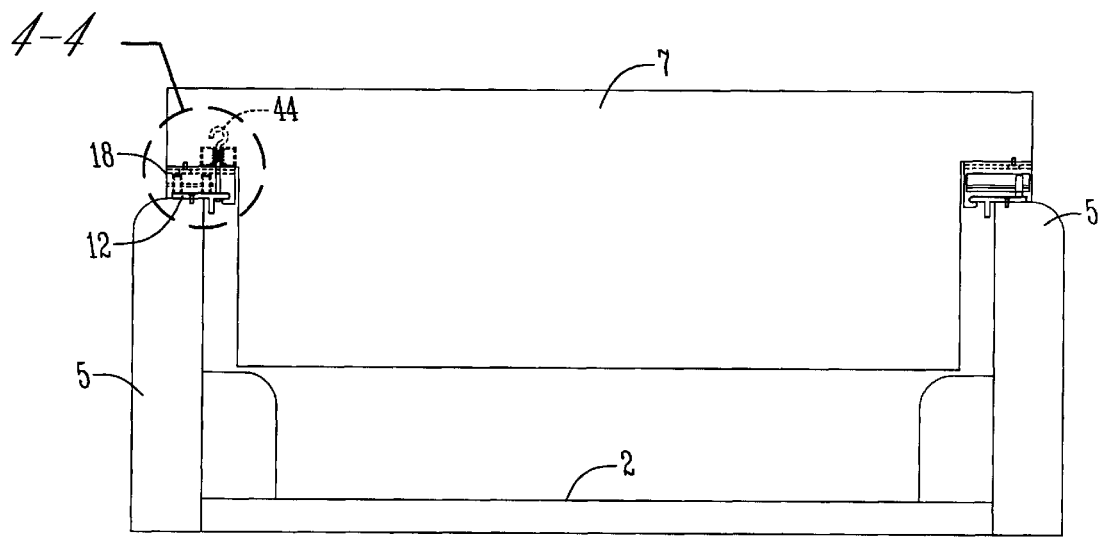
FIG. 2 is a sectional view of FIG. 1 taken along line 2—2 showing the moveable support system.
Figure 3:
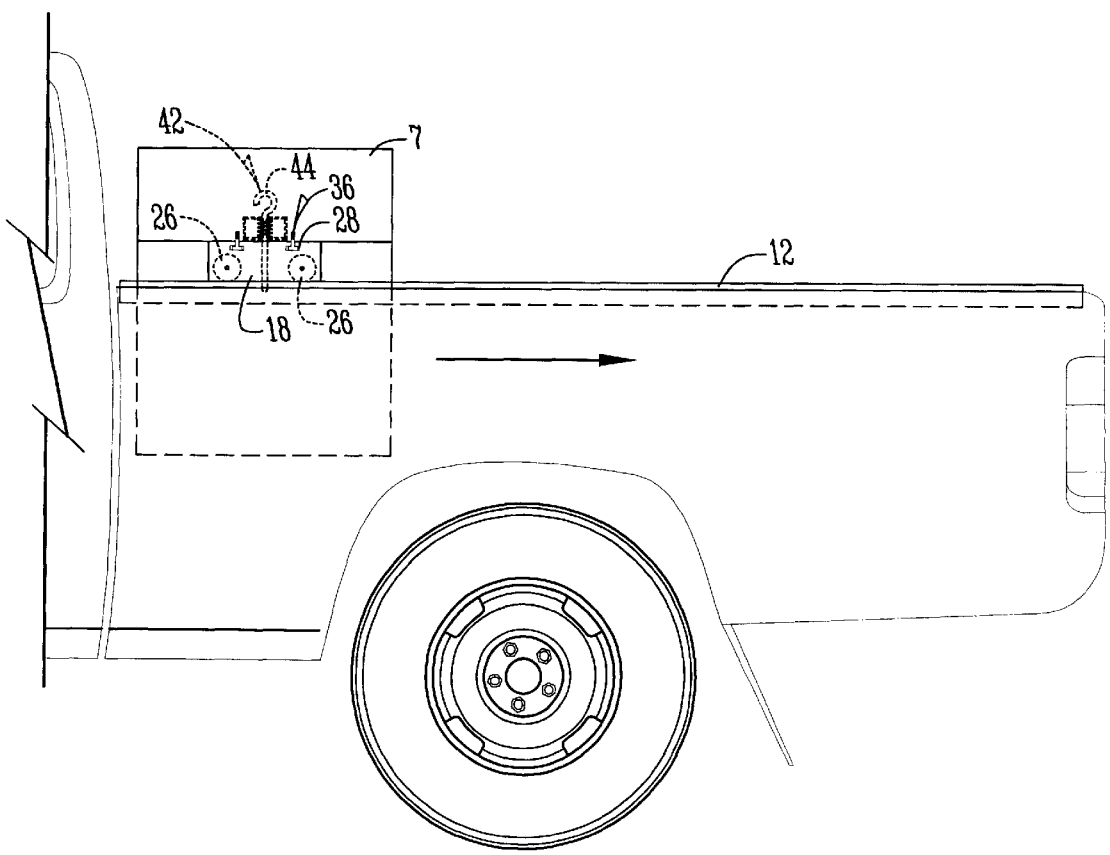
FIG. 3 is a side elevational view of the moveable support system of FIG. 1.

Referring generally to the drawings, a standard pick-up truck 1 has a conventional bed 2 mounted upon a truck chassis behind the truck cab 3. As illustrated in FIG. 1, the bed includes a front wall 4, a pair of side walls 5, and a tail gate 6. The sidewalls of modern pick-up beds vary widely in width and shape making it difficult to adapt a standard supporting system for the different sizes. Shown in FIGS. 1 and 2 is a conventional crossover box 7. While this description outlines a moveable support system for a crossover box, the system can be adapted to other truck accessories.

Figure 4:
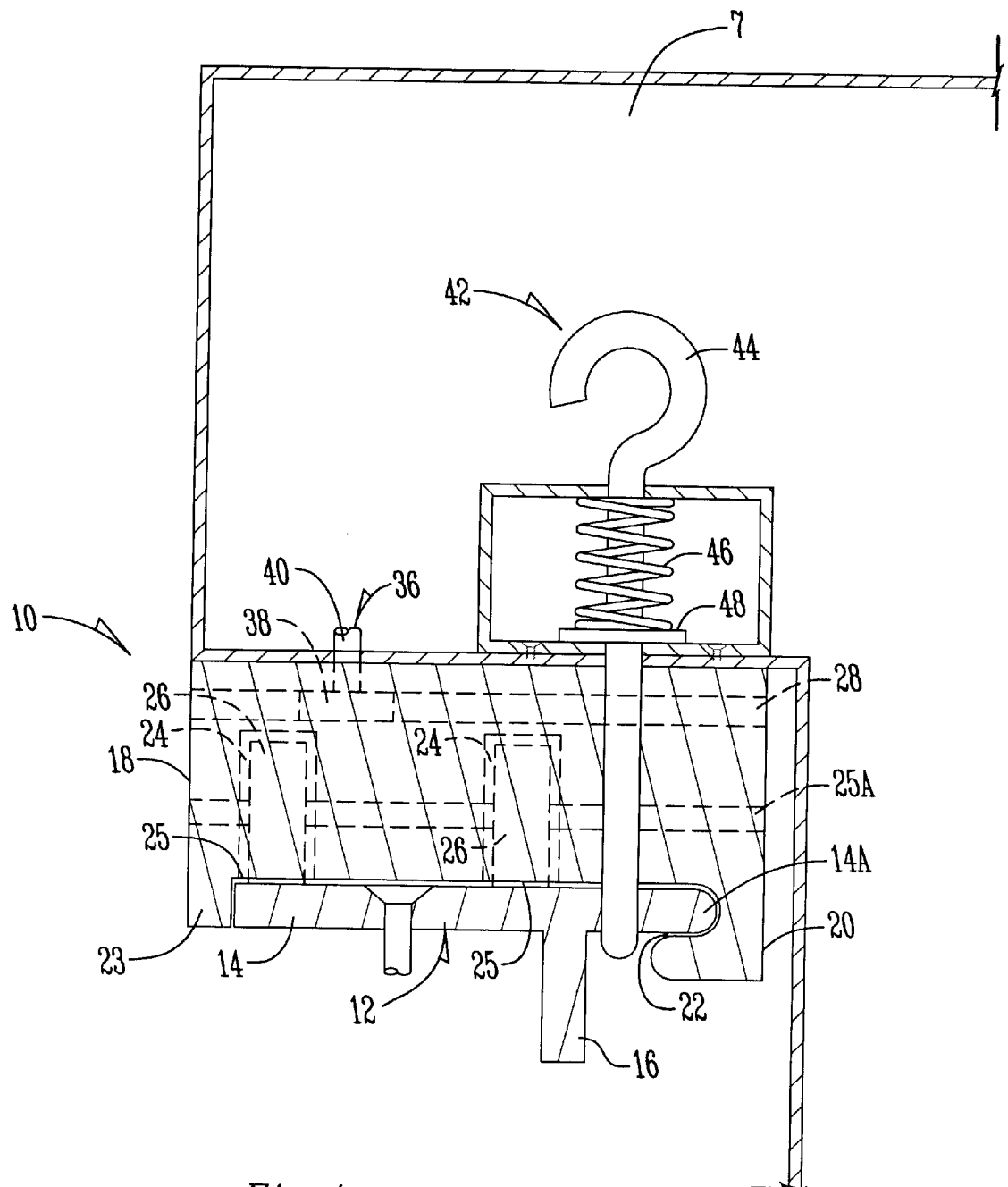
FIG. 4 is an enlarged scale sectional view taken along line 4—4 of FIG. 2.

The mounting support system of the present invention is generally referred to by reference numeral 10. As best shown in FIG. 4, the system has a pair of rails 12 that are mounted to the truck sidewalls 5. The rails include an elongated plate 14 that extends across the top surface 8 of the truck sidewall and a vertical support element 16 that extends downwardly from the plate 14 (FIG. 4) and engages an inner edge 9 of the truck sidewall 5. The rails 12 are mounted to the truck sidewalls either through the plate 14 to the top surface 8 of the sidewalls 5 or through the vertical support member 16 to the inner edge 9 of the sidewalls 5, or both, in any conventional manner. While the rails can be made of a variety of materials, preferred is a fiber reinforced, internally lubricated and UV stabilized HDPE.

Superimposed above the rails 12 are blocks 18 (FIG. 5) that are attached to the bottom of the crossover box 7. The blocks 18 have slide elements 20 on the inner edges of the blocks 18 that extend downwardly and thence outwardly to form a recess 22 that receives an inner end 14A of the plate 14 of the rails 12 as best shown in FIG. 4. On the outer edge of the blocks are vertical shoulders 23 that extend downwardly and engage the outer end of the plate 14 of the rails 12. The sliding member 20 and the shoulder 23 maintain the block in a position to engage the rails 12 as the box 7 is moved along the rails.

Figure 5:
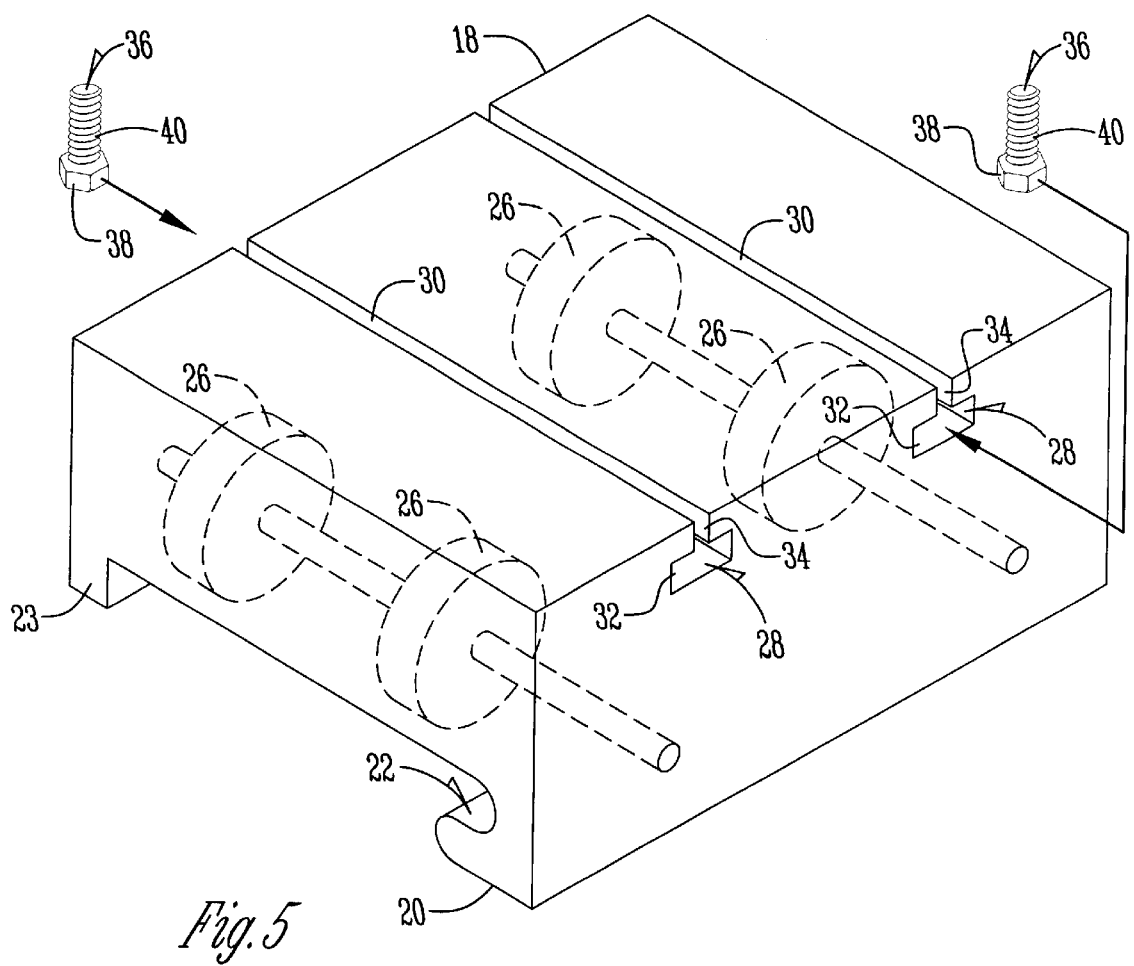
FIG. 5 is a perspective view of the block upon which the tool box is mounted.

Within the block are a plurality of recesses 24 that have a lower opening 25 in communication with the top surfaces of the rails 12. Rotatably mounted by axles 25A within the recesses 24 are wheels 26 that extend through the lower opening 24 and engage the top surface of the rails 12. The wheels 26 support the block 18 and provide the means for moving the block 18 along the elongated rails 12. While a pair of wheels 26 can be used, one for each rail 12, additional wheels 26 can be utilized to provide added support as shown in FIG. 5.

Extending transversely through the block 18 is an inverted T-shaped groove 28 having an open upper end 30. The groove has a horizontal portion 32 and a vertical portion 34. Mounted within the groove 28 is an inverted mounting bolt 36. The head 38 of the bolt is slidably mounted within the horizontal portion 32 of the groove 28, and the stem 40 is slidably mounted in the vertical portion 34 of the groove and extends out of the upper end 30 to connect with the bottom of the crossover box 7. Accordingly, the bolt 36 can be slidably moved through the groove 28 and positioned to connect to crossover boxes 7 that are designed to fit truck beds of various sizes and widths. To provide a stronger connection between the blocks 18 and the crossover box 7 two grooves 28 and a plurality of bolts 36 are used as shown in FIG. 5. While the blocks can be made of many materials, preferred is fiber reinforced, internally lubricated and UV stabilized Acetel (POM).

The locking means 42 is provided to secure the blocks 18 in place and prevent movement along the rails 12. While any conventional locking means can be used, preferred is a spring loaded pin 44 that extends from the crossover box 7, through a vertical bore in the blocks, terminating in a vertical bore in the plate 14 of the rail 12. To disengage the blocks 18 from the rail 12 the pin 44 is pulled upwardly to compress spring 46 via washer 48 until the lower end of the pin 44 is withdrawn from the bore in the plate 14.

Having thus described the invention it should be understood that numerous structural modifications and adaptations may be resorted to without departing from the spirit of the invention.

What is claimed is:

1. A moveable support system for a crossover tool box that extends over the sidewalls of a truck comprising:
    a pair of elongated rails mounted to the truck sidewalls, the rails including an elongated plate that extends across the top surface of the truck sidewalls and a vertical support element on an inner side of the plate for engaging an inner edge of the truck sidewalls;
    a pair of blocks attached to a bottom of the crossover box, the blocks including slide elements on inner edges of the blocks extending downwardly and thence outwardly to form recesses that receive the rails, and vertical shoulders on the outer edges of the blocks extending downwardly to engage an outer edge of the rails;
    a plurality of recesses within the block each having a lower opening in communication with a top surface of the rails;
    wheels rotatably mounted in the recesses of the block and engaging the top surface of the rails;
    at least one inverted T-shaped groove extending transversely through the block and having an open upper end, the T-shaped groove having a horizontal portion and a vertical portion; and
    at least one inverted mounting bolt having a head slidably mounted in the horizontal portion of the groove and a stem slidably mounted in the vertical portion of the groove, with the stem extending upward out of the upper end of the groove for connection to the crossover box.

2. The device of claim 1 further comprising a releasable locking means for preventing the block from sliding on the rails.

3. The device of claim 1 further comprising two pairs of wheels rotatably mounted in the recesses and engaging the top surface of the rails.

4. The device of claim 1 further comprising two inverted T-shaped grooves extending transversely through the block and having open upper ends, the T-shaped grooves having horizontal portions and vertical portions.

5. The device of claim 3 wherein the releasable locking means comprises at least one spring loaded pin that extends through the bottom of the crossover box, the block, and the rails.

6. A moveable support system for a crossover tool box that extends over the sidewalls of a truck comprising:
    a pair of elongated rails mounted to the truck sidewalls, the rails including an elongated plate that extends across the top surface of the truck sidewalls and a vertical support element on an inner side of the plate for engaging an inner edge of the truck sidewalls;
    a pair of blocks attached to a bottom of the crossover box, the blocks including slide elements on inner edges of the blocks extending downwardly and thence outwardly to form recesses that receive the rails, and vertical shoulders on the outer edges of the blocks extending downwardly to engage an outer edge of the rails;
    a plurality of recesses within the block each having a lower opening in communication with a top surface of the rails;
    wheels rotatably mounted in the recesses of the block and engaging the top surface of the rails;
    at least one inverted T-shaped groove extending transversely through the block and having an open upper end, the T-shaped groove having a horizontal portion and a vertical portion;
    at least one inverted mounting bolt having a head slidably mounted in the horizontal portion of the groove and the stem slidably mounted in the vertical portion of the groove, with the stem extending upward out of the upper end of the groove for connection to the crossover box; and
    a releasably locking means for preventing the block from sliding on the rails.

7. The device of claim 6 further comprising two pairs of wheels rotatably mounted in the recesses and engaging the top surface of the rails.

8. The device of claim 6 further comprising two inverted T-shaped grooves extending transversely through the block and having open upper ends, the T-shaped grooves having horizontal portions and vertical portions.

9. The device of claim 6 wherein the releasable locking means comprises at least one spring loaded pin that extends through the bottom of the crossover box, the block, and the rails.

* * * * *